(12) United States Patent  
Belfiglio

(10) Patent No.: US 6,889,589 B1  
(45) Date of Patent: May 10, 2005

(54) SAW BLADE GUIDE AND COMPONENTS THEREFOR

(76) Inventor: Edward E. Belfiglio, 4112 Foxrun La., Owensboro, KY (US) 42303

( * ) Notice: Subject to any disclaimer, the term of this patent is extended or adjusted under 35 U.S.C. 154(b) by 0 days.

(21) Appl. No.: 09/644,484

(22) Filed: Aug. 23, 2000

(51) Int. Cl.$^7$ ............................ B26D 1/54; B27B 13/10
(52) U.S. Cl. ............................. 83/824; 83/820; 83/829
(58) Field of Search ..................... 83/820, 821, 824, 83/829

(56) References Cited

U.S. PATENT DOCUMENTS

| | | | | |
|---|---|---|---|---|
| 177,622 | A | * | 5/1876 | Cordesman, Jr. ............. 83/829 |
| 201,498 | A | * | 3/1878 | Clark ........................... 83/824 |
| 313,025 | A | * | 2/1885 | Rowlett .................... 83/820 X |
| 425,102 | A | | 4/1890 | McChesney ................. 83/824 |
| 651,652 | A | | 6/1900 | Davis ........................... 83/824 |
| 732,799 | A | * | 7/1903 | Trout et al. ............... 83/824 X |
| 2,743,745 | A | | 5/1956 | Teague ..................... 83/821 X |
| 2,760,531 | A | | 8/1956 | Tommila ..................... 83/821 |
| 3,104,575 | A | | 9/1963 | Robinson ..................... 83/168 |
| 3,489,189 | A | | 1/1970 | Thrasher ...................... 83/821 |
| 3,534,647 | A | | 10/1970 | Mills ............................ 83/820 |
| 3,563,285 | A | * | 2/1971 | Thrasher .................. 83/820 X |
| 3,593,763 | A | | 7/1971 | Neild ....................... 83/821 X |
| 3,872,762 | A | * | 3/1975 | McKillip et al. ............. 83/820 |
| 4,563,928 | A | | 1/1986 | Salomonsson ............... 83/821 |
| 4,625,810 | A | * | 12/1986 | Edmisson ................... 172/749 |
| 4,632,074 | A | * | 12/1986 | Takahashi et al. ....... 123/90.39 |
| 4,644,833 | A | | 2/1987 | Jenkner ......................... 83/99 |
| 4,920,846 | A | | 5/1990 | Duginske et al. ............. 83/820 |
| 5,211,092 | A | | 5/1993 | Blasi ............................ 83/98 |
| 5,410,934 | A | | 5/1995 | Krippelz ...................... 83/820 |
| 5,497,684 | A | | 3/1996 | Martin .......................... 83/13 |
| 5,993,915 | A | * | 11/1999 | Krebsbach .................. 427/452 |
| 6,202,528 | B1 | * | 3/2001 | Morgan ...................... 83/824 |

* cited by examiner

Primary Examiner—Clark F. Dexter
(74) Attorney, Agent, or Firm—C. Richard Martin

(57) ABSTRACT

An improved guide for stabilizing the saw blade of a saw mill assembly is provided. The guide includes a guide block having a first surface for engaging a surface of a saw blade and a second opposing surface. A threaded shaft extends outwardly from the second surface of the guide block, and is generally rotatable in relation to the guide block. A securing nut threadably engages the shaft such that a surface of the securing nut engages the second surface of said guide block upon rotation into engagement therewith thereby rendering the threaded shaft nonrotable in relation to the guide block. An improved guide block or insert is also provided. The insert is bi-metallic such that the metallic material proximal to a first blade-engaging surface thereof is harder than the metallic material proximal to a second guide-engaging surface.

9 Claims, 3 Drawing Sheets

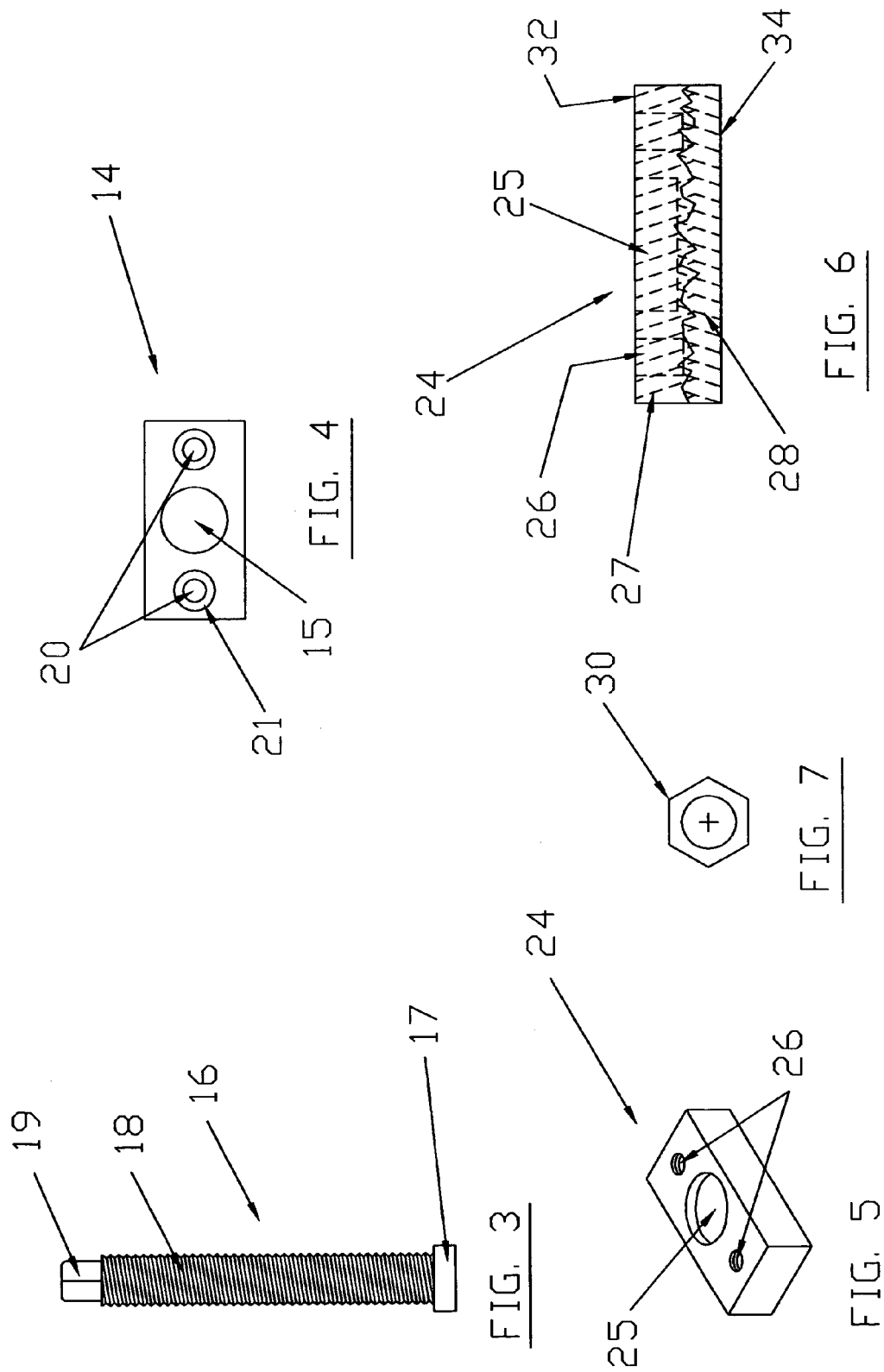

SAW BLADE GUIDE AND COMPONENTS THEREFOR

BACKGROUND OF THE INVENTION

This invention relates generally to saw blade guides and blocks or inserts used on such guides to stabilize a circular saw blade or a band saw blade of a sawmill. More specifically, this invention relates to a saw blade guide that incorporates a rotational device for orienting said saw blade guide to an optimum position and providing microscopic adjustment of said saw blade guide on a saw blade and the inserts for the saw blade guide.

Generally, saw blade guides have long been known and used for stabilizing both circular saw blades and band saw blades. While some early saw blade guides, such as those disclosed in U.S. Pat. No. 425,105 to R. McChesney issued on Apr. 8, 1890, use inserts or blocks which are removably fastened to the saw blade guide by means of threaded fasteners, none of those prior art inserts use cap screws for holding the inserts in place which are countersunk or counterbored within the insert or guide block which are threadably inserted onto and removed from a blade opposing surface of the insert and guide surface and remove from a blade opposing surface of the insert and guide surface upon which the insert is mounted.

Moreover, none of the prior art inserts that are mounted on the blade guides are constructed of a bimetal consisting of carbon steel on one surface and an austenitic chromium carbide abrasion resistant alloy on the opposing surface of the insert.

Further, none of the prior art saw guides and inserts incorporate a system for rotating a rectangular insert on a cylindrical head which incorporates a threaded rod. The cylindrical head and threaded rod allows for microscopic adjustment of the saw guide and orientation of the rectangular guide and insert for optimum stabilization, and a securing nut for holding the guide in its optimum position.

SUMMARY OF THE INVENTION

It is the object of my invention to provide a novel metal insert for a saw blade guide of a sawmill.

It is a further object of my invention to provide a novel metal insert for a saw blade guide that is removably attached to the saw guide.

It is a further object of my invention to provide a novel metal insert for a saw blade guide, which is constructed of a bimetal. The bimetal insert is formed such that the metallic material on the portion of the insert that comes into contact with the saw blade is harder than the metallic material near the opposing surface thereof. The bimetal according to a preferred embodiment comprises an austenitic chromium carbide abrasion resistant alloy on the surface that comes into contact with the saw blade and carbon steel on the opposing side of the insert.

It is a further object of my invention to provide a novel device for rotating a rectangular guide with an insert attached on a cylindrical head and incorporating a threaded rod for the purpose of microscopic adjustment and optimum orientation of the guide and insert to the saw blade, and providing a securing nut on said threaded rod for holding the guide in position.

Briefly, in accordance with my invention there is provided a metal insert for a saw blade guide for stabilizing a saw blade. The material selected for the insert is from the group consisting of a bimetal with one side carbon steel and the opposite side an austenitic chromium carbide abrasion resistant alloy that has a Brinell hardness number between about 460 to 614.

Further, in accordance with my invention, there is provided a saw blade guide for mounting a blade-stabilizing insert thereon. The guide consists of a base plate and an insert disposed on one surface of the base plate. The block and the insert define an interiorily drilled and counterbored blind hole that contains the cylindrical end of the threaded rod. Said insert is attached to the guide block by means of screws passing through drilled and countersunk holes in the guide block and into tapped holes in the insert. A securing nut engaging the outer surface of the threaded shaft is also provided. The securing nut is rotatable with respect to the threaded shaft such that a surface of the securing nut engages the top surface of said base plate upon rotation into engagement therewith thereby rendering the threaded shaft non-rotable in relation to the base plate.

These and other objects, features and advantages of the present invention will become apparent to those skilled in the art from the following detailed description and attached drawings upon which, by way of example, only the preferred embodiments of my invention are illustrated.

BRIEF DESCRIPTION OF THE DRAWINGS

FIG. 3 shows a front elevation view of a cylindrical rotational device and incorporated threaded rod being a component of the preferred embodiment of a guide for stabilizing a saw blade shown in FIG. 1.

FIG. 4 shows a top plan view of a rectangular base plate being a component of the preferred embodiment of a guide for stabilizing a saw blade shown in FIG. 1.

FIG. 5 shows a perspective view of a novel saw guide insert being a component of FIG. 1.

FIG. 6 shows a side elevation view of a novel saw guide insert being a component of FIG. 1.

FIG. 7 shows a top plan view of a jam nut being a component of the guide shown in FIG. 1.

DESCRIPTION OF THE PREFERRED EMBODIMENTS

Figure 1:
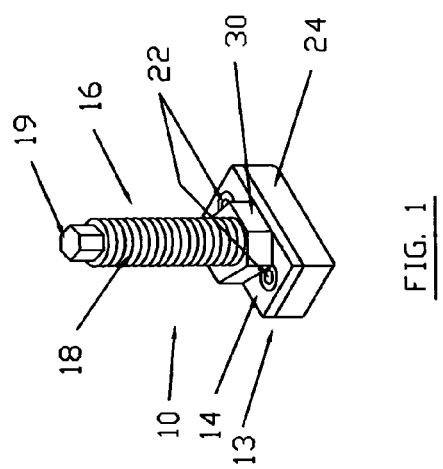
FIG. 1 shows a perspective view of a guide for stabilizing a saw blade according to a preferred embodiment of the present invention.
Figure 2:
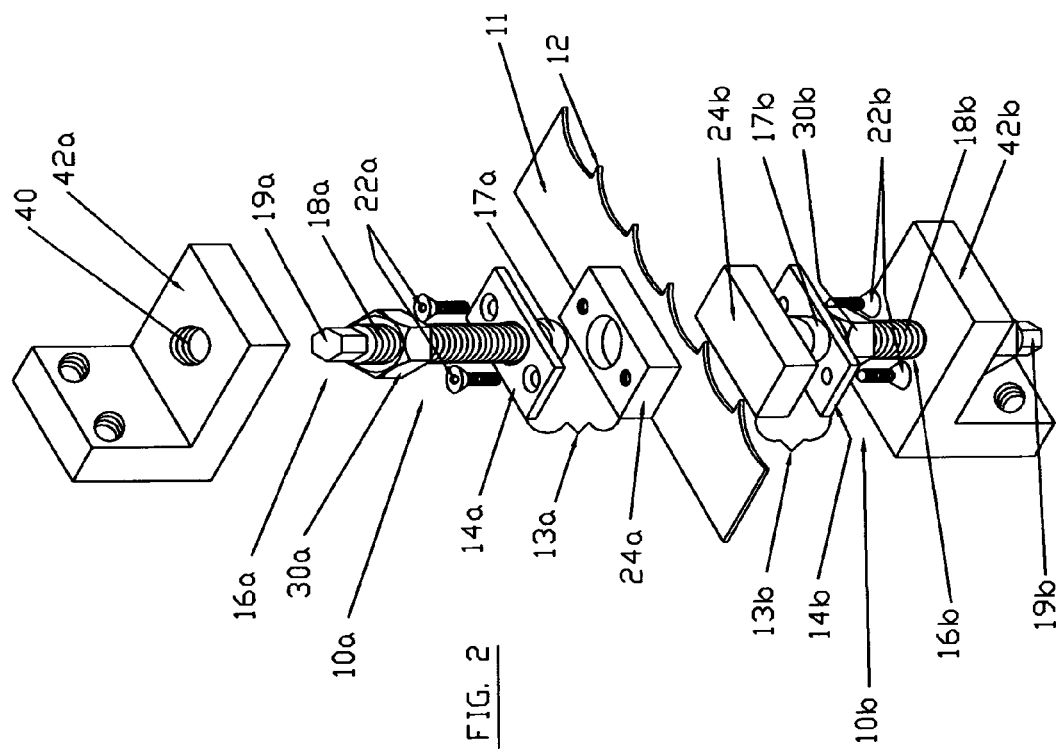
FIG. 2 shows an exploded perspective view of a pair of opposing guides for stabilizing a saw blade, illustrating a preferred embodiment of the present invention.

Referring now to the drawings and, in particular, to FIG. 1 and FIG. 2, there is shown in a preferred embodiment of my invention, an improved blade guide 10, for use in a conventional band saw mill assembly (not shown) to stabilize a band saw blade 11 having cutting teeth 12. The use of two improved blade guides 10a, 10b on opposing surfaces of the blade 11, as shown in FIG. 2, limits or effectively prevent lateral vibration, bending or dishing of the blade during sawing operations. A third blade guide (not shown) may be further positioned along the smooth edge of the blade to prevent longitudinal vibration or displacement of the blade. At the outset, it will be understood that the assemblies 10a, 10b can also be used to stabilize a circular saw blade of a circular saw mill if so desired.

Each blade guide 10 includes a guide block 13, which according to the embodiment shown in FIGS. 1–7, includes a base plate 14 having a top surface and a bottom surface and an insert 24. The base plate 14 and insert 24 are preferably rectangular in shape as shown in the drawings, however, other polygonal shapes and configurations are also contemplated. An opening 15 disposed in the center region of the base plate 14 is configured to rotatably receive a threaded shaft 16 therein. The shaft 16 has an enlarged head section 17 at a first end thereof, a male-threaded section 18 along at least a portion of the length thereof, and a hexagonal head 19 at a second end thereof.

The opening 15 in the base plate is of a diameter larger than the outer diameter of the threaded section 18 of the shaft 16, but smaller in diameter than the diameter of the enlarged head section 17. Therefore, in assembling the blade guide, the length of the shaft is passed through the opening 15 until the enlarged head section 17 comes into contact with a bottom surface of the base plate 14, such that the shaft 16 can rotate freely in relation to the base plate 14.

The base plate 14 also includes one or more untapped screw holes 20 therein for receiving a corresponding one or more fasteners 22. According to the shown preferred embodiment, two holes 20 are formed in the base plate 14, one on either side of the larger central opening 15. Each screw hole 20 may have a recessed frustroconical countersunk or counterbored portion 21 formed above the screw hole 20 so that a cap screw, such as is shown at 22 in FIG. 1 and FIG. 2, can be inserted therein to a level below the upper surface of the base plate 14. Preferably the cap screws 22, as shown in the example of FIG. 1 and FIG. 2, is of the hex socket type for use of a standard hex wrench to secure and loosen the base plate 14 from a corresponding blade guide insert 24, although other types of commonly known cap screws and fasteners could be employed wherein a standard tool such as a screwdriver could be used to secure and remove the blade guide insert from the base plate.

The threaded shaft 16 is threadably received in a threaded opening 40 disposed in a conventional mounting bracket 42 of the saw mill assembly. The configuration of the mounting bracket 42 shown in FIG. 2 is old and well known in the art and the specific configuration of the bracket 42 is of no particular consequence to the invention. The position of the guide block 13 relative to the blade 11 can be adjusted by rotation of the shaft 16 in relation to the mounting bracket 42 thereby effecting linear translational movement of the shaft 16 along its longitudinal axis. Rotation of the shaft 16 relative to the mounting bracket 42 can be effectuated by engaging the hexagonal head 19 with an appropriately sized and shaped tightening tool such as a wrench. The hexagonal configuration of the second end of the shaft 16 is merely one common example of a head configuration that permits the use of ordinary hand tools to impart rotation to the shaft. It is understood and contemplated that the head on the second end of the shaft may have different geometric configurations depending upon the tool that the user desires to employ. By way of example only, and not to limit the possible structures contemplated, the head 19 could be square to accommodate certain wrenches, slotted to accommodate a screwdriver, or a hex socket type for use of a standard hex wrench to secure.

The blade guide insert 24 comprises a metallic block of material having an upper surface 32 and a lower surface 34, each said surface having a generally rectangular shape, although other polygonal shapes are also contemplated. A circular recess 25 is formed in the central region of the upper surface 32 of the guide insert to rotatably receive the protruding enlarged head 17 of the shaft 16. One or more tapped screw holes 26, which correspond in location with said one or more untapped screw holes 20 in the base plate 14, are also provided in the upper surface 32 of the guide insert 24, for threadably receiving the corresponding one or more fasteners 22. According to the shown preferred embodiment, two holes 26 are formed in the upper surface of the guide insert 24, one on either side of the larger central recess 25, and corresponding to the two holes 20 formed in the base plate 14.

As best shown in FIG. 6, the guide insert 24 is formed of a bimetallic material such that the metal of lower region 28 is harder and more abrasion resistant than the metal of the upper region 27. The metal used on the lower region 28 will be in direct contact with the saw blade 11 by way of lower surface 34, and therefore should consist of a highly abrasion resistant alloy. Preferably austenitic chromium-carbide alloy having a Brinell hardness number between 460 and 614 is used as the metallic material for the lower region 28. The upper region 27 must consist of a sufficiently soft material to allow drilling for the tapped screw holes 26 and machining of the circular recess 25 therein. Preferably, carbon steel is used as the metallic material for the upper region 27. The bi-metallic guide insert is formed in such a way that the region near the center of the insert 24 consists of a combination of the two metals, thereby providing one unitary, solid, bimetallic block insert.

A securing nut 30 is provided to fixedly secure the base plate 14 and guide insert 24 in non-rotatable engagement with the shaft 16. The inner surface of the securing nut threadably engages the threaded region 18 of the shaft. By rotating the nut 30 in relation to the shaft, the nut can be translated along the longitudinal axis of the shaft 16. When the nut is translated to the lowermost position on the shaft 16, a lower surface of the nut 30 frictionally engages the upper surface of the base plate 14, thereby preventing rotation of the base plate with respect to the shaft. When the nut 30 is rotated such that the lower surface thereof does not frictionally engage the upper surface of the base plate, the guide block 13 is freely rotatable in relation to the shaft 16.

According to the preferred use and operation of the present invention, two guide assemblies 10a, 10b are disposed on opposing sides of the saw blade 11 to prevent lateral vibration, bending or dishing of the blade during sawing operations. The threaded shaft 16 is threadably received in a threaded opening disposed in a mounting bracket of the saw mill assembly. The position of the guide blocks 13a, 13b relative to the blade 11 are then adjusted by engaging the hexagonal heads 19a, 19b with an appropriate wrench to rotate the shafts 16a, 16b in relation to the mounting brackets to move the shafts 16a, 16b and guide blocks 13a, 13b along the longitudinal axis of the respective shafts 16a, 16b until the guide blocks 13a, 13b are optimal distances from the blade surface, and extend toward the opposing blade surfaces as shown in FIG. 2. The nuts 30a, 30b are disposed along the respective longitudinal axes of the shafts 16a, 16b such that the lower surface thereof is not in engagement with the upper surface of the respective base plates 14a, 14b, thereby permitting the base plates 14a, 14b and the inserts 24a, 24b respectively carried thereon to freely rotate about the axes of the respective shafts 16a, 16b. This allows the guide blocks 13a, 13b to be rotated such that the major longitudinal axis of each guide block aligns with the longitudinal axis of the blade 12. Once the guide blocks 13a, 13b are properly positioned, the nuts 30a, 30b are rotated until the lower surfaces thereof come into frictional engagement with the respective upper surfaces of the base plates 14a, 14b, and then the nuts are tightened against the base plates to prevent rotation of the base plate relative to the shaft, thereby securing the guide block in the properly aligned position with regard to the blade.

Figure 8:
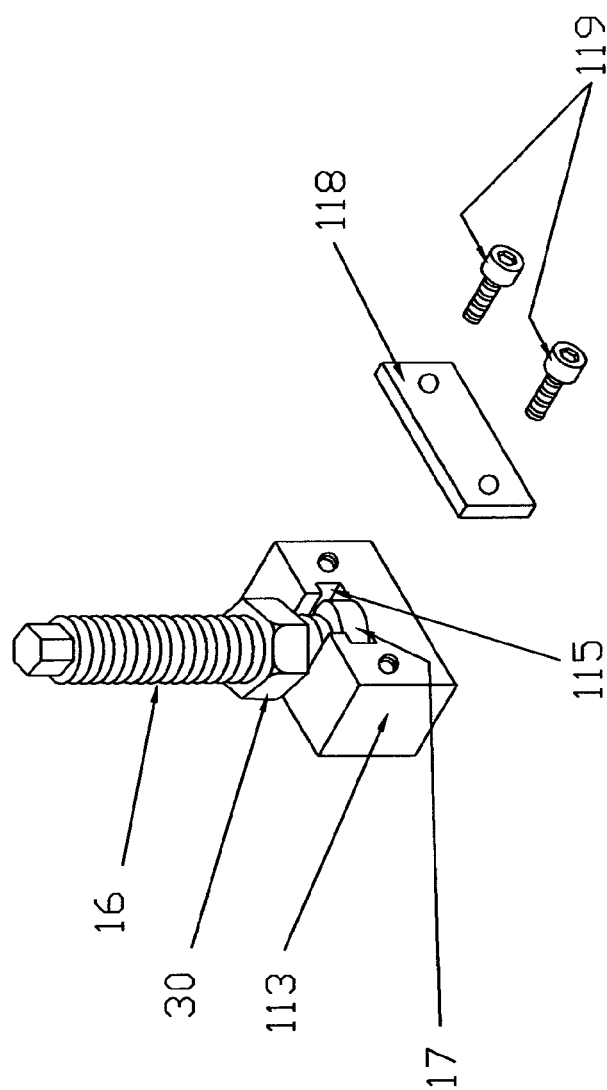
FIG. 8 shows an exploded perspective view of a guide for stabilizing a saw blade according to an alternative embodiment of the present invention.
Figure 9:
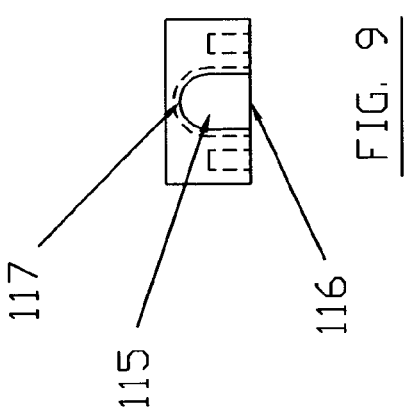
FIG. 9 shows a top plan view of a guide insert being a component of the guide shown in FIG. 8.

A guide block 113 according to an alternative preferred embodiment is shown in FIG. 8 and FIG. 9. The guide block 113 according to the alternative embodiment includes a T-slot 115 formed therein. The T-slot 115 has an open end 116 along one sidewall of the guideblock and a closed end 117 near a central portion of the block 113. The closed end 117 may be rounded so as to accommodate the enlarged circular head 17 of the threaded shaft 16 therein. The guide is assembled by sliding the enlarged head 17 of the shaft 16 into the large opening of the T-slot with the shaft 16 extending through the smaller T-slot opening. The T-slot 115 is sized and shaped to allow rotation of the shaft 16 relative to the guide block 113. An end plate 118 is secured over the open end of the T-slot to secure the shaft 16 therein. The end plate 118 is secured to the guide block by fasteners 119 in the same manner the base plate of the first embodiment is secured to the insert. A securing nut 30 is also provided to render the shaft nonrotatable in relation to the guide block when a surface of the nut engages the upper surface of the guide block 113.

Although the present invention has been illustrated and described herein with respect to certain preferred embodiments, it is not intended that this patent should be limited in scope and coverage by such details other than as specifically set forth in the following claims.

I claim:

1. A guide for stabilizing a saw blade, said guide comprising:
   a guide block having a first polygonal shaped surface for engaging a surface of said saw blade and a second opposing surface;
   a single, threaded shaft extending outwardly from a centerpoint of said second surface of said guide block, said threaded shaft having a head on a first end thereof, said head rotatably engaging said guide block, and a second end received in a mounting bracket of a saw mill, wherein said guide block is supported by only said single threaded shaft;
   a securing nut threadably engaging an outer threaded surface of said threaded shaft and positioned between said mounting bracket and said guide block, said securing nut being rotatable with respect to said threaded shaft such that a surface of the securing nut engages the second surface of said guide block upon rotation into engagement therewith thereby rendering the threaded shaft nonrotatable in relation to the guide block.

2. The guide of claim 1 wherein said guide block comprises:
   a base plate having a top surface and a bottom surface; and
   an insert disposed on said bottom surface of said base plate, said insert having an upper surface in engagement with said bottom surface of said base plate and a lower surface for engaging a surface of a saw blade.

3. The guide of claim 2 further comprising one or more fasteners for securing said insert to said base plate.

4. The guide of claim 3, wherein said one or more fasteners extend from the bottom surface of the base plate into an upper surface of said insert.

5. The guide of claim 4, wherein said one or more fasteners pass through corresponding one or more openings in said base plate.

6. The guide of claim 5, wherein said one or more fasteners are threaded fasteners and said insert includes one or more corresponding threaded opening for receiving said threaded fasteners.

7. The guide of claim 1, wherein said guide block is bi-metallic, the metallic material of said bi-metallic guide block proximal to the first surface thereof being harder than the metallic material proximal to the second surface thereof.

8. The guide of claim 7, wherein the metallic material proximal to the first surface thereof is chromium-carbide.

9. The guide of claim 8, wherein the metallic material proximal to the first surface thereof is austenitic chromium-carbide.

* * * * *